United States Patent [19]

Iijima

[11] Patent Number: 5,161,231
[45] Date of Patent: Nov. 3, 1992

[54] PROCESSING SYSTEM WHICH TRANSMITS A PREDETERMINED ERROR CODE UPON DETECTION OF AN INCORRECT TRANSMISSION CODE

[75] Inventor: Yasuo Iijima, Yokohama, Japan

[73] Assignee: Kabushiki Kaisha Toshiba, Kawasaki, Japan

[21] Appl. No.: 667,376

[22] Filed: Mar. 12, 1991

Related U.S. Application Data

[63] Continuation of Ser. No. 361,349, Jun. 5, 1989, abandoned, which is a continuation of Ser. No. 97,660, Sep. 16, 1987, abandoned.

[30] Foreign Application Priority Data

Sep. 27, 1986 [JP] Japan .................... 61-229149
Nov. 14, 1986 [JP] Japan .................... 61-271207

[51] Int. Cl.$^5$ .................. H04L 13/00; G06F 11/00; G06F 11/14
[52] U.S. Cl. ................... 395/800; 364/DIG. 1; 364/DIG. 2; 364/265; 364/265.1; 364/932.1; 235/380
[58] Field of Search ............ 395/DIG. 1, DIG. 2, 395/800; 235/380, 80, 79, 487, 449, 492; 371/33, 34, 35

[56] References Cited

U.S. PATENT DOCUMENTS

| | | | |
|---|---|---|---|
| 4,439,859 | 3/1984 | Donnan | 371/32 |
| 4,575,621 | 3/1986 | Dreifus | 235/380 |
| 4,707,592 | 11/1987 | Ware | 235/379 |
| 4,712,214 | 12/1987 | Meltzer et al. | 371/32 |
| 4,760,514 | 7/1988 | Hasegawa et al. | 364/200 |
| 4,779,274 | 10/1988 | Takahashi et al. | 371/32 |

FOREIGN PATENT DOCUMENTS

| | | |
|---|---|---|
| 0182244 | 5/1986 | European Pat. Off. . |
| 0190733 | 8/1986 | European Pat. Off. . |
| 0194839 | 8/1988 | European Pat. Off. . |
| 0049650 | 4/1982 | France . |
| 60-220645 | 5/1985 | Japan .................... 371/32 |

OTHER PUBLICATIONS

Farber et al., "Bussysteme, Parallele und serielle Bussysteme in Theorie und Proxis," Mit 150 Bildern und 29 Tabellen, 1984, pp. 104–128.
English Patent Abstract of Japan "Data Transmission System." vol. 10, No. 75 (Nov. 5, 1985).
John D. Lenk, "The Protocol Link", Handbook of Communications, (1984) pp. 292–295.

*Primary Examiner*—Thomas C. Lee
*Assistant Examiner*—Robert B. Harrell
*Attorney, Agent, or Firm*—Cushman, Darby & Cushman

[57] ABSTRACT

According to a portable electronic apparatus processing system of this invention, when an IC card receives instruction data, it checks if a function code can be completely input. If the function code is not completely input, the IC card sets data "FF" (hexadecimal code) as the function code, and outputs it to an IC card reader/writer. When the IC card reader/writer outputs an instruction to the IC card, it appends sequential number data to the instruction. The IC card executes processing corresponding to the supplied instruction. When the IC card outputs the processed result to the IC card reader/writer, it appends the sequential number data from the IC card reader/writer to the processed result and outputs it.

6 Claims, 10 Drawing Sheets

F I G. 6A (PRIOR ART)
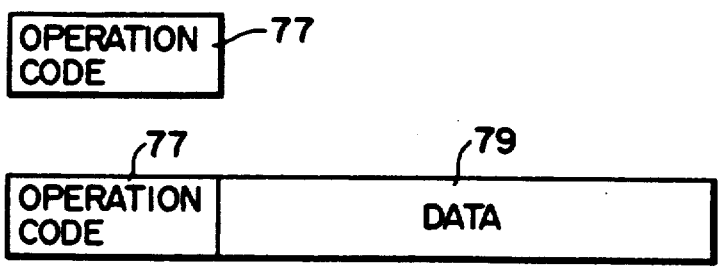
F I G. 6B (PRIOR ART)
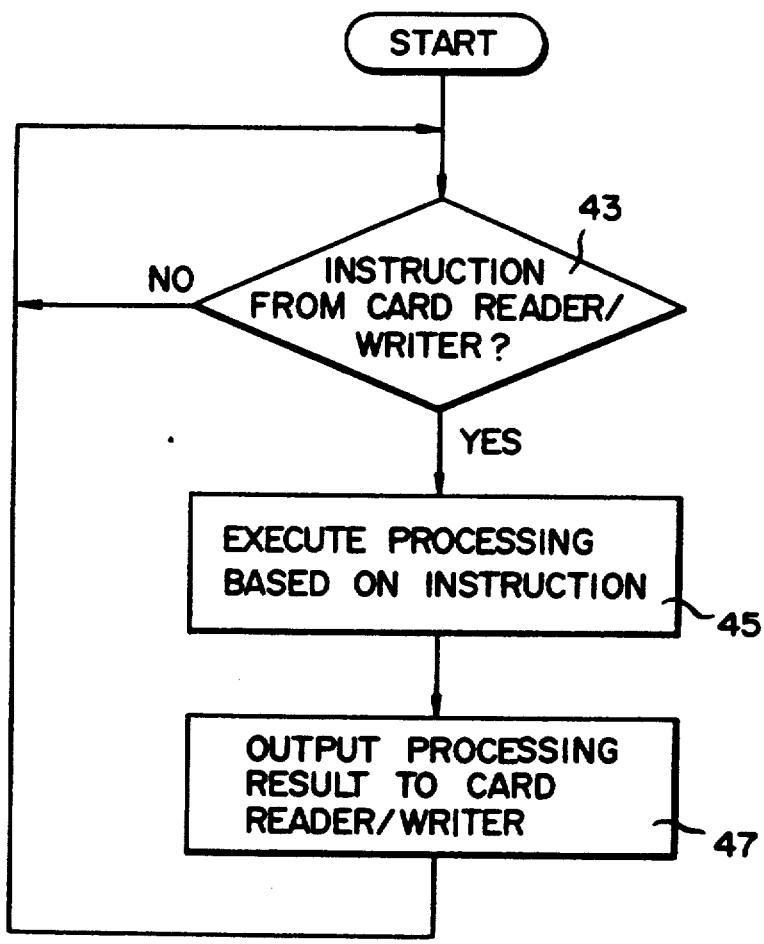
F I G. 7 (PRIOR ART)

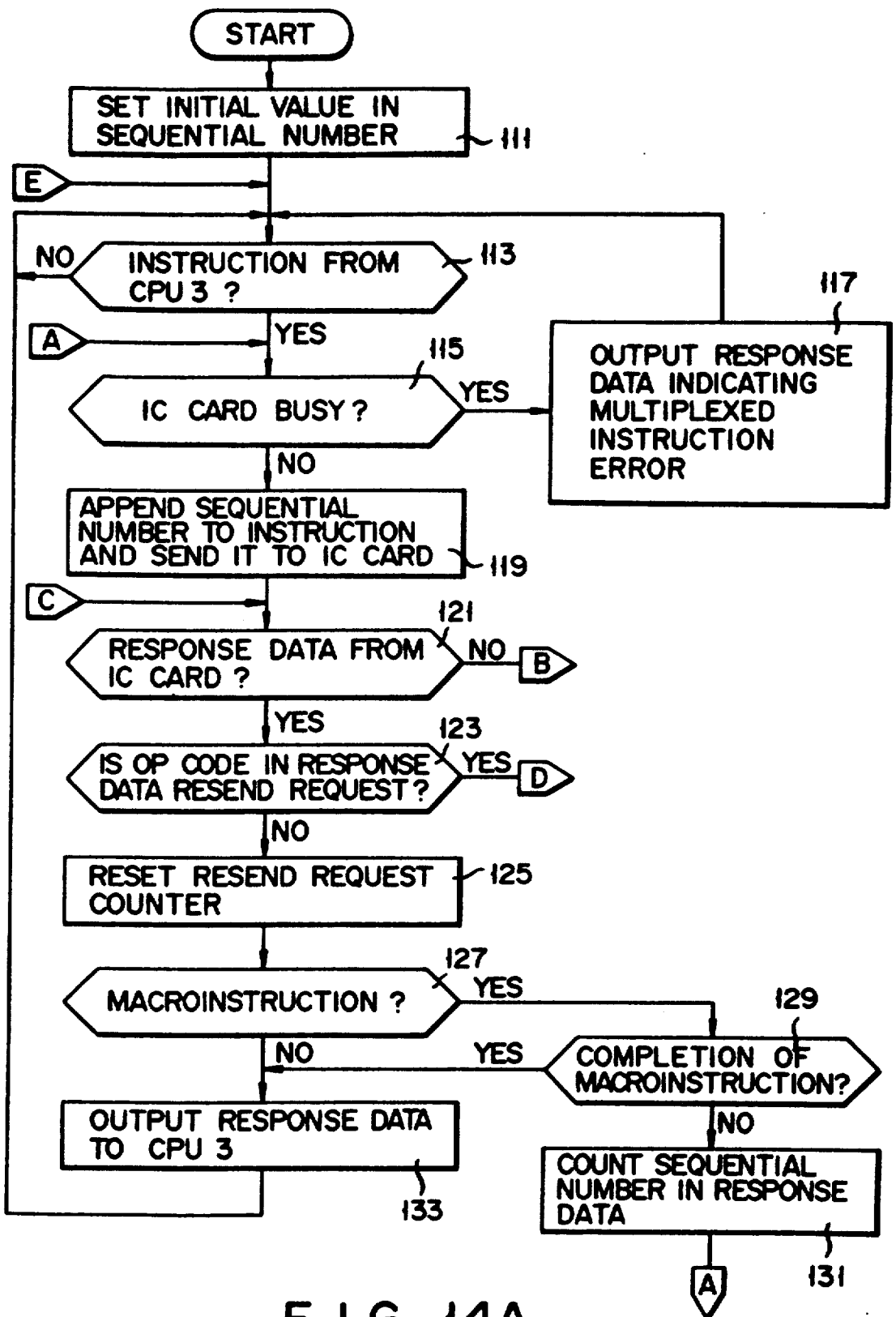
F I G. 14A

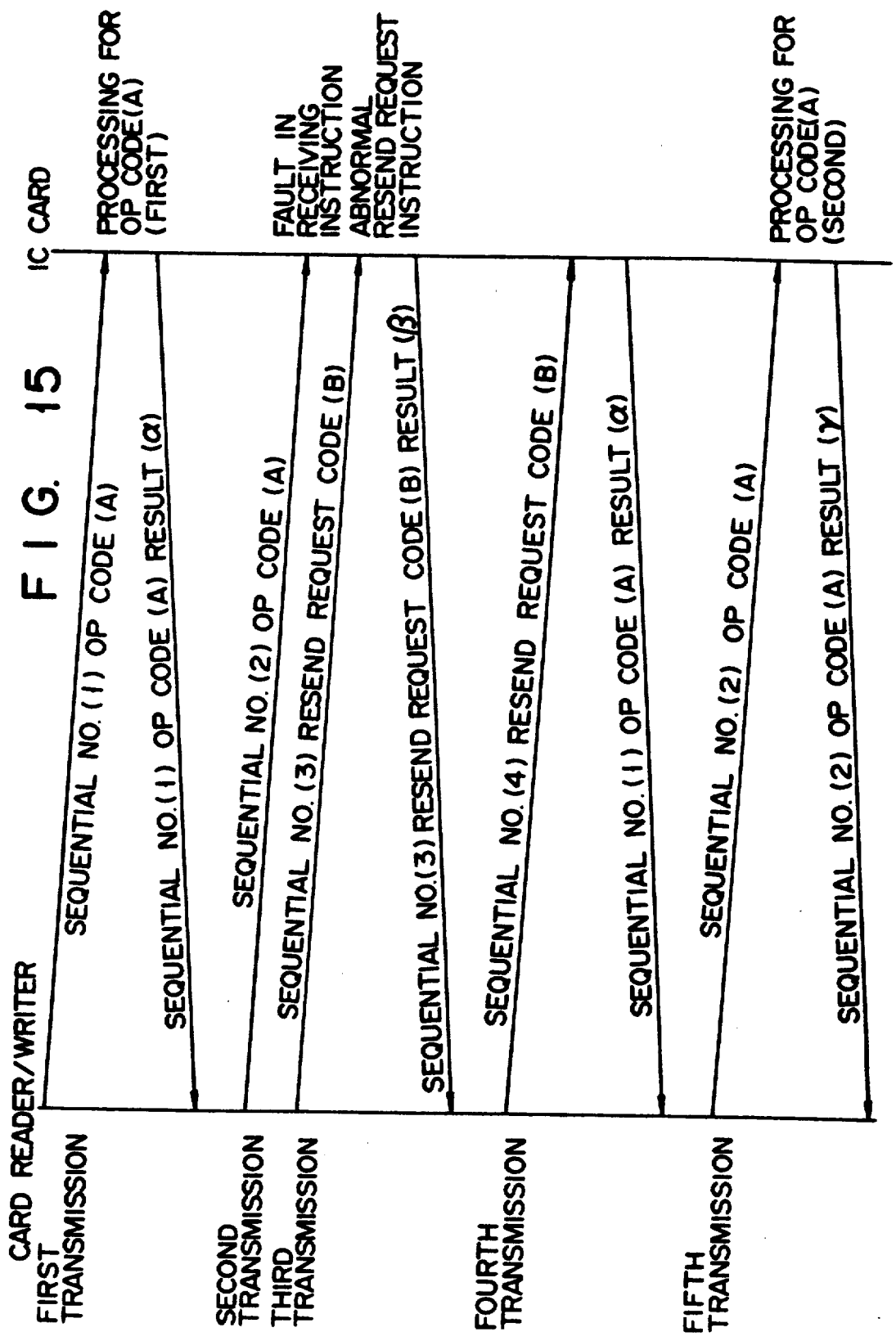

PROCESSING SYSTEM WHICH TRANSMITS A PREDETERMINED ERROR CODE UPON DETECTION OF AN INCORRECT TRANSMISSION CODE

This is a continuation of application Ser. No. 07/361,349, filed on Jun. 5, 1989, which was abandoned upon the filing hereof which is a continuation of Ser. No. 07/097,660 filed Sep. 16, 1987, now abandoned.

BACKGROUND OF THE INVENTION

The present invention relates to a processing system for a portable electronic apparatus, e.g., an IC card.

Recently, an IC card incorporating an IC chip having a nonvolatile data memory and a control element such as a CPU (Central Processing Unit) has been developed. An IC card of this type is normally operated using a card reader/writer. This operation is performed by an instruction supplied from the card reader/writer. The IC card decodes an operation code (OP code) of the received instruction, and executes a series of processing corresponding to a function indicated by the OP code. Then, the IC card outputs the processed result to the card reader/writer as response data. In this case, a function code included in the input instruction is attached to the response data to compensate for the irregular sequence of instructions exchanged between the IC card and the card reader/writer. More specifically, the OP code is extracted from the instruction stored in a buffer upon an input of the instruction data, and the extracted OP code is attached to the processed result when the processed result is output to the card reader/writer.

However, with this method, when no OP code is included in the instruction from the card reader/writer (in the case of an illegal instruction), or when the instruction cannot be normally received due to transmission noise, wrong data may be output to the card reader/writer as the OP code. This is because a portion corresponding to the OP code of the instruction stored in the buffer is simply extracted and attached to the processed result as the OP code. For this reason, when a sequence between the card reader/writer and the IC card is disordered, the compensation may be impossible. In particular, when instructions having the same OP code are successively transmitted a plurality of times, the sequence may often be disordered. When sequence disorder occurs upon transmission of data write instruction data, an abnormality such as double writing of data occurs.

SUMMARY OF THE INVENTION

It is an object of the present invention to provide a processing system for a portable electronic apparatus which can eliminate sequence disorder between a card reader/writer and an IC card when an illegal instruction is sent from the card reader/writer or when an instruction cannot be normally received due to transmission noise, and which can reliably prevent sequence disorder between the card reader/writer and the IC card when instructions having the same OP code are successively transmitted a plurality of times.

In order to achieve the above object, according to the present invention, there is provided a processing system constituted by a portable electronic apparatus handling apparatus for outputting an instruction having at least a function code field indicating a content of processing, and a portable electronic apparatus which is connected to the portable electronic apparatus handling apparatus as needed so as to receive the instruction supplied from the portable electronic apparatus handling apparatus, execute processing corresponding to the received instruction, and output a processed result with the function code attached thereto to the portable electronic apparatus handling apparatus, the improvement comprising:

checking means for checking if the function code of the instruction supplied from the portable electronic apparatus handling apparatus is input; and output means for outputting, to the portable electronic apparatus handling apparatus, specific data indicating that the function code is not input when the checking means determines that the function code is not input.

According to the present invention, when IC card 1 fetches instruction data, it checks if a function code can be completely received. If it is not completely received, card 1 assigns data "FF" in an OP code portion of response data to be output to card reader/writer 2. As a result, wrong data cannot be output as an OP code, unlike in the conventional system. Therefore, even when illegal instruction data is sent from card reader/writer 2, or when an instruction cannot be normally received due to transmission noise, sequence disorder between card reader/writer 2 and IC card 1 can be eliminated.

A sequential number starting from a specific initial value is attached to instruction data output from the card reader/writer. The IC card receiving the instruction attaches the sequential number of the received instruction to response data and outputs it so that sequence disorder that cannot be prevented by response data with only a function code can be prevented. More specifically, since the sequential number attached to the instruction data is attached to the response data, the relationship between the instruction and the response data can be easily discriminated from the sequential number. In particular, when instructions having the same OP code are successively transmitted a plurality of times, sequence disorder between the card reader/writer and the IC card can be reliably prevented.

BRIEF DESCRIPTION OF THE DRAWINGS

FIGS. 6A and 6B show formats of a conventional instruction output from a card reader/writer;

FIG. 7 is a flow chart for explaining the operation of a conventional IC card;

FIGS. 14A and 14B are flow charts for explaining a detailed operation of the card reader/writer according to the embodiment of the present invention; and FIG. 15 is a chart showing a detailed transmission sequence between the card reader/writer and the IC card in the embodiment of the present invention.

DETAILED DESCRIPTION OF THE PREFERRED EMBODIMENTS

Figure 1:
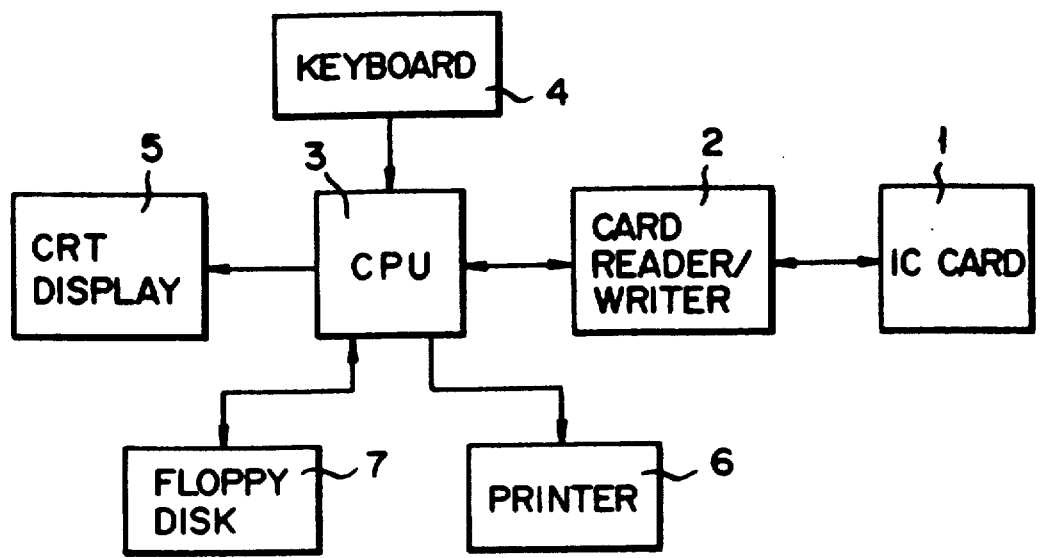
FIG. 1 is a block diagram showing the arrangement of a conventional card handling apparatus.

FIG. 1 shows the arrangement of a card handling apparatus used as a terminal for a home banking system or a shopping system to which an IC card as a portable electronic apparatus is applied. The card handling apparatus comprises card reader/writer 2 for performing read/write access of the IC card 1, keyboard 4 for inputting data such as a personal identification number (PIN), CRT display unit 5 for displaying transaction data, printer 6 for printing out the transaction data, floppy disk 7 for storing the transaction data, and central processing unit (CPU) 3 for controlling card reader/writer 2, keyboard 4, CRT display unit 5, printer 6, and floppy disk 7.

IC card 1 is carried by a user, subjected to collation with a PIN known only by a user upon purchasing of commodities, and used to store necessary data.

Figure 2:
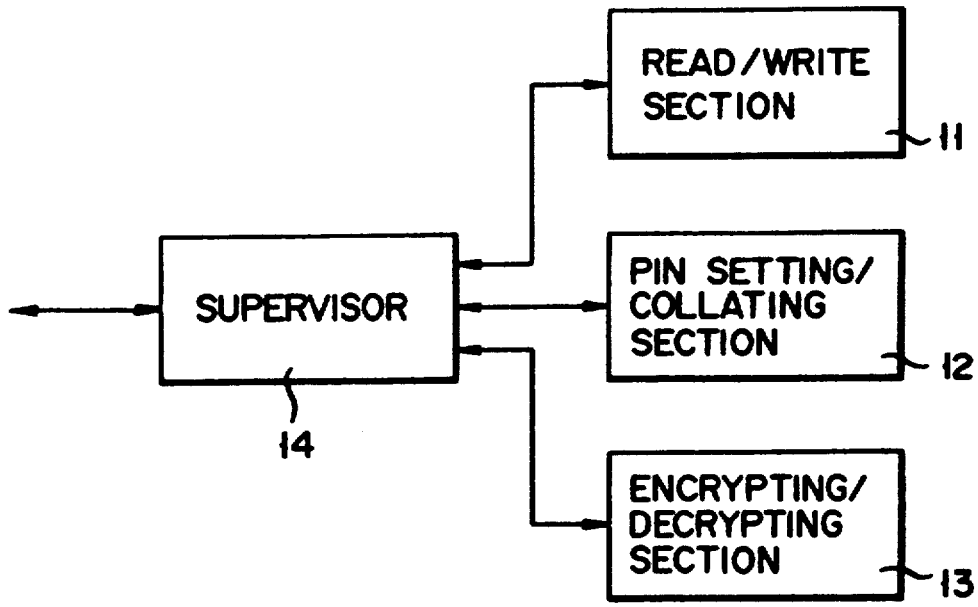
FIG. 2 is a block diagram showing functions of a conventional IC card.
Figure 3:
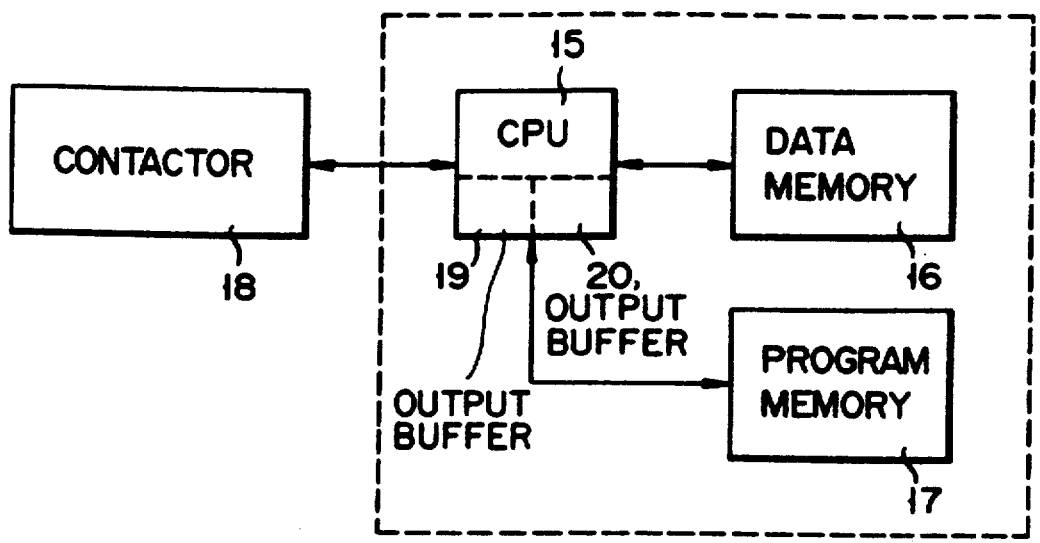
FIG. 3 is a block diagram showing the arrangement of an IC chip incorporated in an IC card to which the present invention is applied.

FIG. 2 shows functional blocks of IC card 1. IC card 1 comprises sections for executing basic functions, such as read/write section 11, PIN setting/collating section 12, and encrypting/decrypting section 13, and supervisor 14 for controlling these basic functions. Read/write section 11 performs data read, write, or erase access with data memory 16. PIN setting/collating section 12 performs storage and read inhibition processing of a PIN set by a user, and after the PIN is set, collates the set PIN to provide permission for the subsequent processing. Encrypting/decrypting section 13 performs encryption for preventing disclosure and forgery of communication data when data is transmitted from CPU 3 to another terminal through a communication line, and decrypts encrypted data. Data encryption is performed in accordance with an encryption algorithm having a sufficient encryption power, such as the Data Encryption Standard (DES). Supervisor 14 decodes an operation code (OP code) input from card reader/writer 2 or the OP code with data, and selects and executes a necessary function.

In order to effect these functions, IC card 1 is constituted by central processing unit (CPU) 15, non-volatile data memory 16 whose storage contents are erasable, program memory 17, and contactor 18 for electrically contacting card reader/writer 2. CPU 15, data memory 16, and program memory 17 comprise a commercially available microprocessor chip (e.g., Intel 8080 or an equivalent). CPU 15 has first output buffer 19 and second output buffer 20. Note that the number of output buffers is not limited to 2.

Program memory 17 comprises a mask read-only memory (ROM), and has a control program for controlling CPU 15. The control program includes a subroutine group for effecting a function corresponding to an OP code of an instruction supplied from card reader/writer 2. Data memory 16 comprises an electrically erasable programmable read-only memory (EE-PROM).

Figure 4:
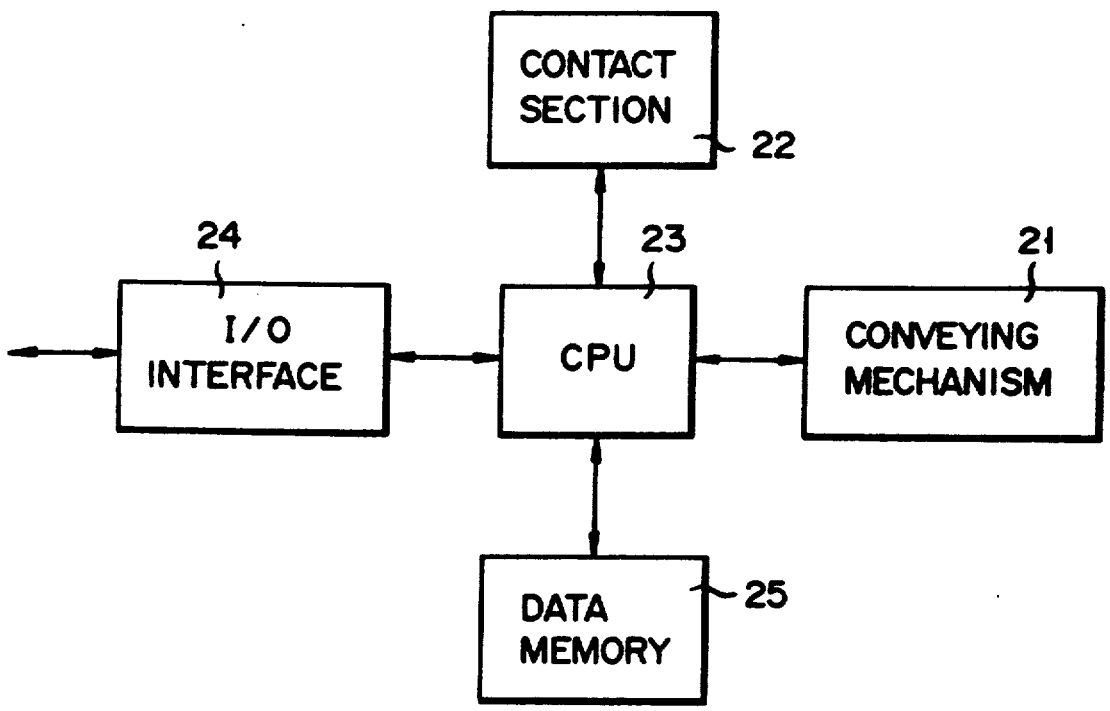
FIG. 4 is a block diagram showing the arrangement of a conventional card reader/writer.

Card reader/writer 2 exchanges an OP code or data with CPU 3 of IC card 1. More specifically, as shown in FIG. 4, card reader/writer 2 comprises conveying mechanism 21 for conveying IC card 1 inserted in a card insertion port (not shown) to a predetermined position, contact section 22 for electrically contacting contactor 18 of IC card 1 set at the predetermined position, CPU 23 for controlling the overall operation, I/O interface 24 adapted to cause CPUs 23 and 3 to exchange instruction and response data therebetween, and data memory 25 for storing data.

Figure 5:
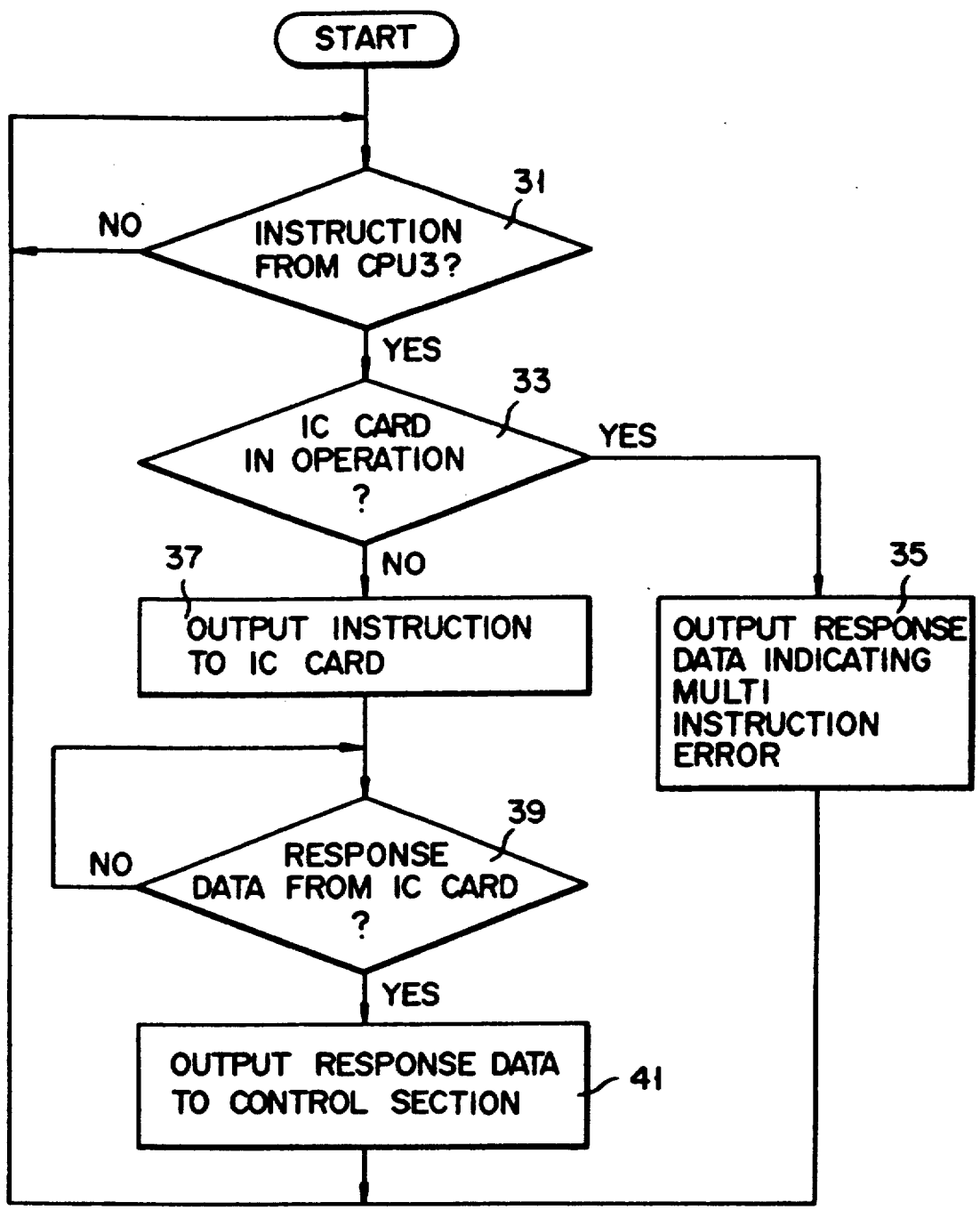
FIG. 5 is a flow chart for explaining the operation of a conventional card reader/writer.

FIG. 5 is a flow chart showing the operation of card reader/writer 2. More specifically, it is checked in step 31 if an instruction is supplied from CPU 3. If NO in step 31, the flow returns to step 31, and CPU 23 awaits input data. If YES in step 31, it is checked in step 33 if IC card 1 is in operation. If YES in step 33, response data indicating a multi instruction error is output to CPU 3, and the flow returns to step 31.

If NO in step 33, control advances to step 37, and an instruction is output to IC card 1. In step 39, CPU 23 awaits response data from IC card 1. If the response data is detected in step 39, control advances to step 41, and the response data is output to CPU 3.

FIGS. 6A and 6B show instruction formats output to IC card 1. FIG. 6A shows an instruction format consisting of only an OP code 77, and FIG. 6B shows an instruction format consisting of an OP code 77 and data 79.

Figure 8:
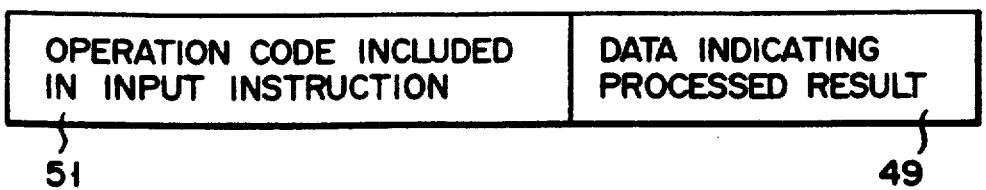
FIG. 8 shows a format of response data output from an IC card.

IC card 1 is operated in accordance with the flow chart shown in FIG. 7. CPU 15 awaits an input instruction from card reader/writer 2 in step 43. When CPU 15 detects the instruction from card reader/writer 2 in step 43, CPU 15 executes processing based on the instruction in step 45. Then, control advances to step 47, and the processing result is output to card reader/writer 2. The flow returns to step 43. FIG. 8 shows the format of response data in this case. As can be seen from FIG. 8, field 51 indicating a function code included in the input command is attached to data field 49 indicating the processed result.

Figure 10:
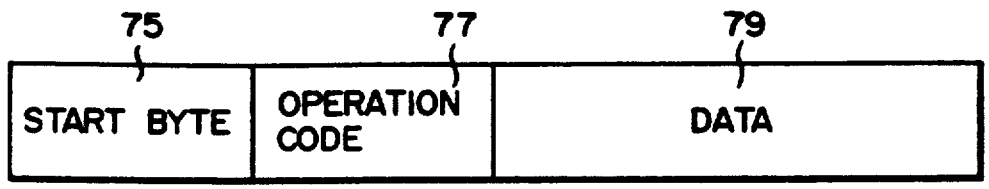
FIG. 10 shows a format of an instruction output from a card reader/writer.
Figure 9:
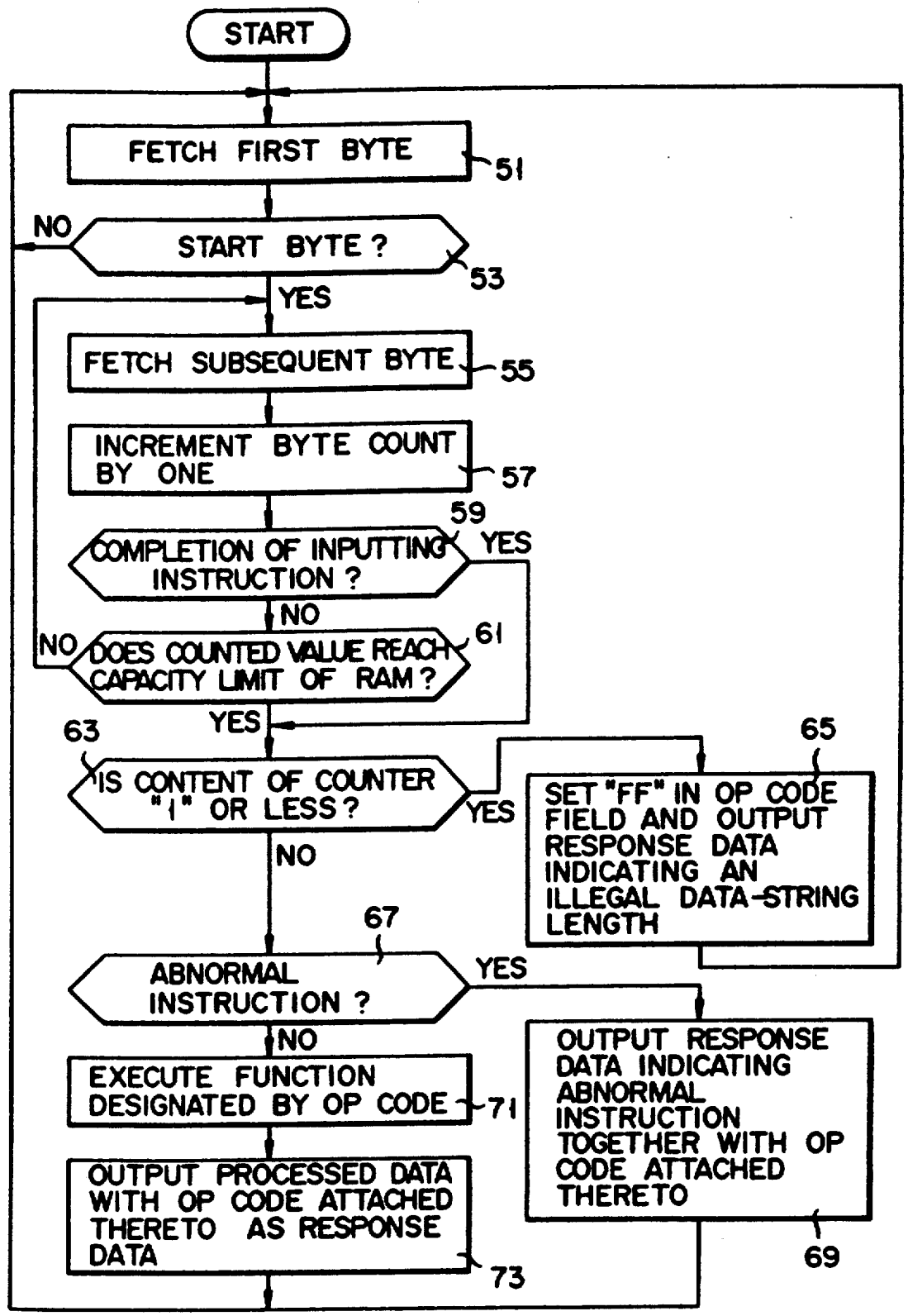
FIG. 9 is a flow chart for explaining instruction fetching and processing operations of the IC card according to an embodiment of the present invention.

An operation will now be described with reference to the flow chart in FIG. 9 wherein IC card 1 fetches an instruction and executes processing in accordance with the invention. When an instruction is to be sent from card reader/writer 2 to IC card 1, start byte field 75 is attached to an instruction in addition to OP code field 77 and data field 79, as shown in FIG. 10. In step 51, the first byte of the input instruction is fetched. It is checked in step 53 if the fetched byte is a start byte. If NO in step 53, the flow returns to step 51. If YES in step 53, the subsequent byte is fetched in step 55. In step 57, a byte count is incremented by one. It is then checked in step 59 if inputting of the instruction is completed. If YES in step 59, the flow advances to step 63. However, if NO in step 59, it is checked in step 61 if the byte count has reached a capacity limit of data memory 16. If NO in step 61, the flow returns to step 55, and the subsequent byte is fetched. On the other hand, if YES in step 61, the flow advances to step 63 to check if the count is "1" or less. When YES is obtained in step 61 and the flow advances to step 63, NO is always obtained in step 63. The capacity limit of the RAM in this case is 32 bytes, and the byte count has reached 32. Therefore, NO is always obtained in step 63.

When the flow advances from step 59 to step 63 and YES is obtained in step 63, although the input data string is completed, the byte count is "1" or less, and this means a substantial instruction has not been received and processing cannot be executed. This is because the OP code consists of 2 bytes. Therefore, if YES in step 63, data "FF" (hexadecimal code) is set in OP code field 77 in step 65, and response data indicating an illegal data-string length is output. More specifically, when CPU 15 receives an instruction from card reader/writer 2 and when it discriminates that no OP code is input, CPU 15 outputs, to card reader/writer 2, the processed result with specific data other than the OP code, e.g., a specific code "FF" (hexadecimal code) as response data.

If NO in step 63, it is checked in step 67 if an abnormal instruction such as parity abnormality is input. If YES in step 67, CPU 15 outputs response data indicating an abnormal instruction together with the OP code attached thereto, and the flow returns to step 51. However, if NO in step 67, CPU 15 executes a function designated by the OP code in step 71, and outputs, to card reader/writer 2, the processed result with the OP code attached thereto as response data in step 73.

In the above embodiment, data exchange between card reader/writer 2 and IC card 1 has been exemplified. The present invention can be applied to data exchange between CPU 3 and card reader/writer 2.

Figure 11A:
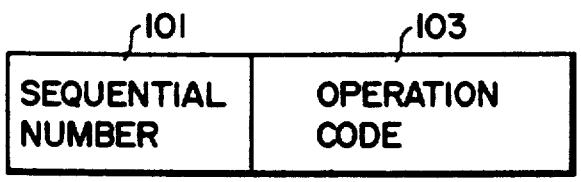
FIGS. 11A and 11B show formats of an instruction output from the card reader/writer.
Figure 11B:
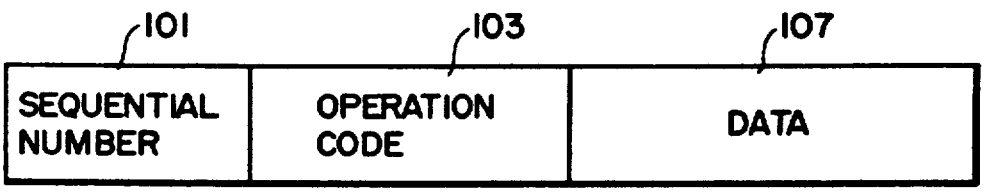

A second embodiment of the present invention will now be described. In this embodiment, in an instruction sent from card reader/writer 2 to IC card 1, a sequential number is attached to the instruction formats shown in FIGS. 6A and 6B, as shown in FIGS. 11A and 11B. A sequential number 10 is attached to an instruction output 103 from card reader/writer 2, and IC card 1 receiving the instruction attaches the sequential number of the received instruction to response data 107 and outputs it to card reader/writer 2.

Figure 13:
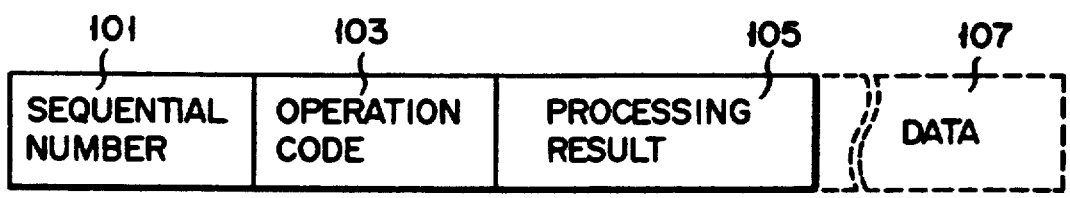
FIG. 13 shows a format of response data output from the IC card in the embodiment of the present invention.
Figure 12:
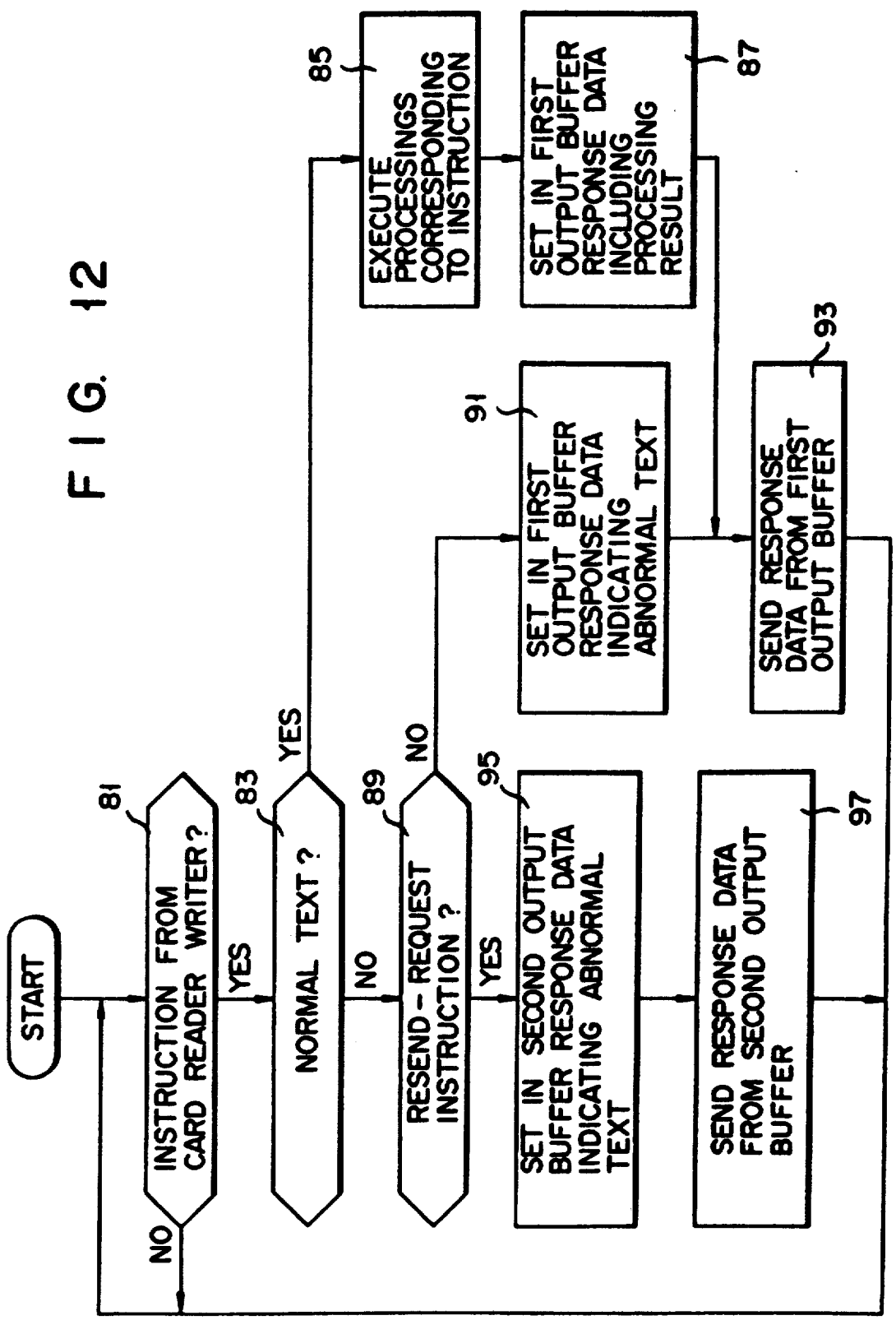
FIG. 12 is a flow chart for explaining the operation of the IC card in the embodiment of the present invention.

The embodiment of the present invention will be described hereinafter with reference to the flow chart shown in FIG. 12. CPU 15 checks in step 81 if an instruction is sent from card reader/writer 2. If NO in step 81, CPU 15 awaits until the instruction arrives. If YES in step 81, it is checked in step 83 if the received text (instruction) is normal. More specifically, it is checked if an OP code included in the text corresponds to any of predetermined OP codes or if the text includes a parity error. If YES in step 83, CPU 15 executes processing corresponding to the input instruction in step 85, and sets the processed result in output buffer 19 in step 87. In step 93, CPU 15 then outputs response data including the processed result set in output buffer 19 to card reader/writer 2. Then, the flow returns to step 81, and CPU 15 awaits the next instruction from card reader/writer 2. The response data which is output from CPU 15 to card reader/writer 2 in step 93 consists of sequential number 101 attached to the instruction sent from card reader/writer 2, OP code 103 attached thereto, processing result 105, and data 107 which is attached if necessary, as shown in FIG. 13.

On the other hand, if NO in step 83, CPU 15 checks in step 89 if the instruction is a resend-request instruction. If NO in step 89, CPU 15 sets response data indicating an abnormal text in first output buffer 19 in step 91, and sends the response data set in first output buffer 19 to card reader/writer 2. Thereafter, the flow returns to step 81, and CPU 15 awaits the next instruction from card reader/writer 2. However, if YES in step 89, CPU 15 sets response data indicating an abnormal text in second output buffer 20 in step 95, and sends the response data set in buffer 20 to card reader/writer 2 in step 97. Thereafter, the flow returns to step 81.

In this embodiment, two output buffers are provided to IC card 1, and they are selectively used to store response data when a resend-request instruction is abnormal and to store data response data including the processed result. With this arrangement, response data including the processed result to be resent cannot be erased by setting response data indicating an abnormal text.

Figure 14B:
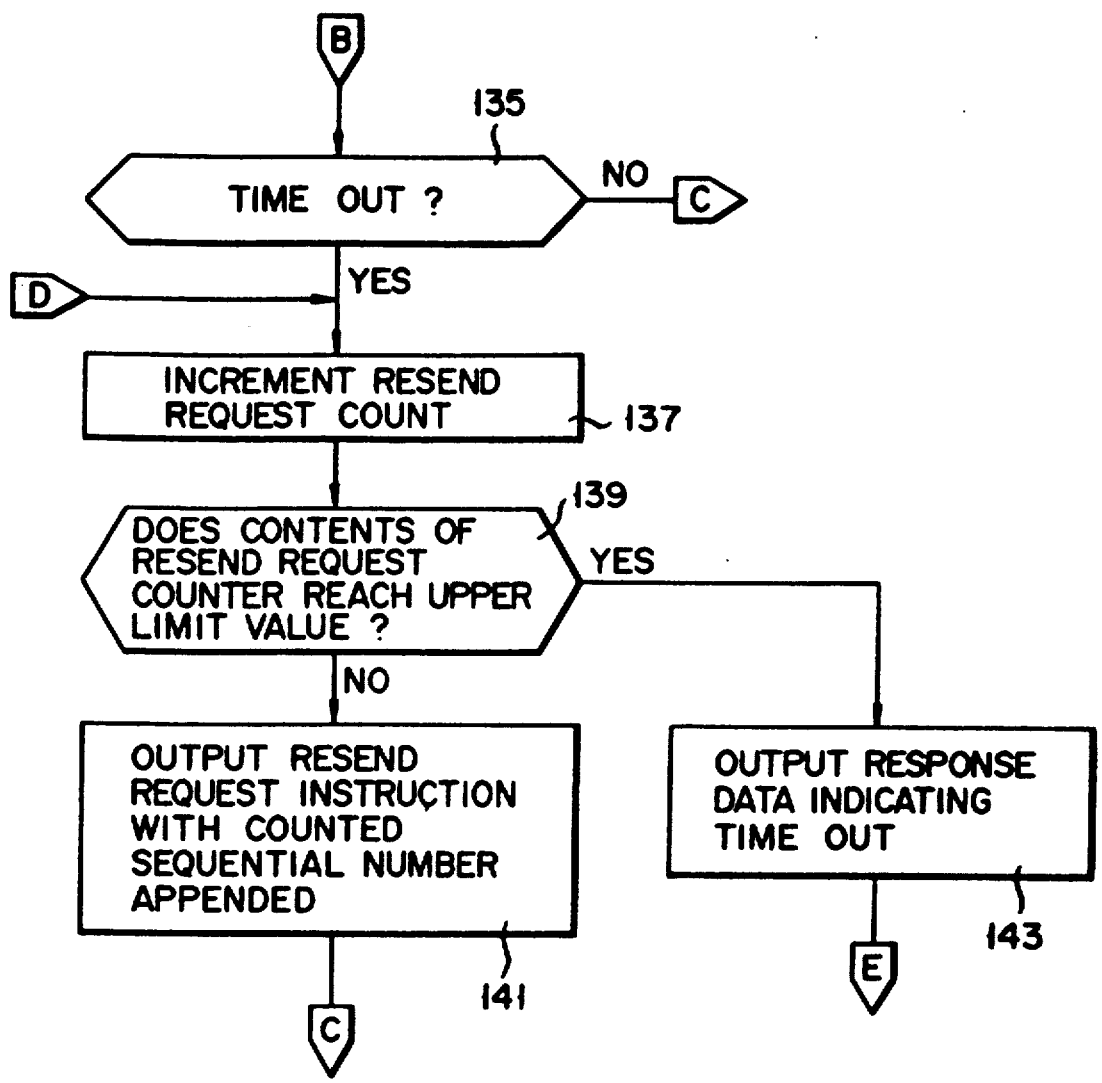

The operation of card reader/writer 2 will now be described with reference to the flow charts shown in FIGS. 14A and 14B. CPU 23 in card reader/writer 2 sets an initial value in a sequential number in step 111, and checks in step 113 if an instruction is supplied from CPU 3. If NO in step 113, CPU 23 waits until an instruction is supplied. If YES in step 113, CPU 23 checks in step 115 if IC card 1 is busy. If YES in step 115, CPU 23 outputs response data indicating a multiplexed instruction error to CPU 3 in step 117, and the flow returns to step 113. If NO in step 115, CPU 23 appends a sequential number to an instruction in step 119 and sends it to IC card 1. CPU 23 then checks in step 121 if response data is supplied from IC card 1. If NO in step 121, CPU 23 checks in step 135 if time is up (time out). If NO in step 135, the flow returns to step 121, and CPU 23 awaits response data from IC card 1. However, if YES is completed in step 129, CPU 23 outputs response data to CPU 3 in step 133. Thereafter, the flow returns to step 113, and awaits the instruction from CPU 3. If NO in step 127, CPU 23 outputs response data to CPU 3 in step 133. Then, the flow returns to step 113, and CPU 23 awaits the instruction from CPU 3.

FIG. 15 shows a detailed transmission sequence between card reader/writer 2 and IC card 1. In the first transmission, card reader/writer 2 sends an instruction with sequential No. (1) and OP code (A) to IC card 1. IC card 1 executes processing corresponding to OP code (A), and sends back response data including sequential No. (1), OP code (A), and processed result (α) to card reader/writer 2. Since the response data with sequential No. (1) is sent back from IC card 1, card reader/writer 2 sends an instruction with sequential No. (2) and OP code (A) to IC card 1 in the second transmission. Assume that IC card 1 fails to receive the instruction itself. In this case, for example, IC card 1 cannot receive the start byte. Card reader/writer 2 confirms that response data corresponding to the instruction when sequential No. (2) is not sent back from IC card 1. However, card reader/writer 2 cannot decide whether IC card 1 cannot receive the instruction or card reader/writer 2 cannot receive the instruction although the response data including the processed result is sent back from IC card 1. Therefore, card reader/writer 2 sends an instruction including sequential No. (3) and OP code (B) indicating a resend request to IC card 1. In the third transmission, assume that IC card 1 receives the instruction with sequential No. (3) from card reader/writer 2 but determines that the received text is abnormal (e.g., the OP code is undesirably converted to a nonregistered OP code during transmission). IC card 1 sends back response data including sequential No. (3), OP code (B) indicating the resend request, and processed result (β) indicating an abnormal text to card reader/writer 2. Upon reception of this data, card reader/writer 2 sends an instruction including sequential No. (4) and OP code (B) indicating the resend request to IC card 1. IC card 1 detects the resend-request instruction with sequential No. (4). Since IC card 1 could not receive an instruction with sequential No. (2), the latest data set in output buffer 19 is the processed result corresponding to the instruction with sequential No. (1). Therefore, IC card 1 sends response data including sequential No. (1), OP code (A), and processed result (α) to card reader/writer 2. Since the processed result corresponding to the instruction with sequential No. (1) is sent back from IC card 1, card reader/writer 2 sends an instruction including sequential No. (2) and OP code (A) to IC card 1 in the fifth transmission. IC card 1 detects this instruction, and executes processing corresponding thereto. Then, IC card 1 sends back response data including sequential No. (2), OP code (A), and processed result (γ) to card reader/writer 2.

In the above embodiment, the IC card has been exemplified as a portable electronic device. However, the shape of the portable electronic device is not limited to a card-like shape. The hardware arrangement of the portable electronic device can be modified within the spirit and scope of the invention.

What is claimed is:

1. A data transmission system in which in IC card accepting device sends instruction data to an IC card, the instruction data including in an instruction code field which includes at least a function code in a function code field indicating a content of processing, and said IC card returning the function code in a received instruction data back to said IC card accepting device, wherein said IC card includes:

means for receiving the instruction data;
   means for checking contents of said instruction code field to determine whether the function code is a preliminarily registered function code;
   first returning means for setting the function code in the function code field and for returning the function code field to said IC card accepting device, only when said checking means indicates that the function code is the preliminarily registered function code; and
   second returning means for setting data in the function code field indicating that the function code in the instruction data received by said receiving means is not the registered function code, and for returning the instruction code field to said IC card accepting device, only when said checking means indicates that the function code is not the registered function code and wherein said IC card accepting device includes:
   means for receiving the data indicating that the function code is not sent by said second returning means; and
   means for in response to the function code resending the instruction data to said IC card.

2. A system according to claim 1, wherein the data is data other than the function code, consists of the same number of bits as the number of bits of the function code, and is set in said function code field.

3. A system according to claim 1, wherein the specified data consists of all "1" bits, and the function code is an arbitrary bit string consisting of not all "1" bits.

4. A data transmission as in claim 1, wherein said checking contents means also includes means for counting a length of an input instruction data; means for determining if the input instruction data is completed; means for determining if the counted length of the input instruction data has reached a predetermined value, and means for setting said data in the instruction code field when said counted length does not reach said specified value when said input instruction data is completed.

5. A data transmission system in which an IC card accepting device sends instruction data to an IC card, the instruction data including at least a function code in a function code field indicating a content of processing, and said IC card returning the function code in a received instruction data back to said Ic card accepting device, wherein said IC card includes:

means for receiving the instruction data;
   first determining means for determining whether or not the instruction data is received correctly by said receiving means;
   second determining means for determining whether or not the function code included in the instruction data is a registered function code when said first determining means determines that the instruction data is received correctly by said receiving means;
   first sending means for sending to said IC card accepting device data indicating that the instruction data is received incorrectly when said first determining means determines incorrect instruction of the instruction data;
   second sending means for sending to said IC card accepting device data indicating that the function code included in the instruction data is not the registered function code when said second determining means determines that the function code in the instruction data is not the registered function code; and
   third sending means for sending a processed result for the instruction data together with the function code to said IC card accepting device if said first determining means determines the correct reception of the instruction data and said second determining means determines that the function code in the correctly received instruction data is the registered function code.

6. The system according to claim 5, wherein said first determining means includes means for counting data length of the instruction data.

* * * * *